United States Patent
Hashimoto et al.

(10) Patent No.: US 9,837,869 B2
(45) Date of Patent: Dec. 5, 2017

(54) STATOR WITH BUS BAR PORTION EMBEDDED BETWEEN ADJACENT LANE CHANGE PORTIONS AND CONNECTED TO TERMINAL PORTION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Hiroyuki Tanaka, Anjo (JP); Takanori Ota, Anjo (JP); Shingo Sato, Okazaki (JP); Daichi Kurashige, Nishio (JP); Hirotaka Kawaura, Toyota (JP); Norihiko Akao, Nissin (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 14/407,227

(22) PCT Filed: Jun. 28, 2013

(86) PCT No.: PCT/JP2013/067903
§ 371 (c)(1),
(2) Date: Dec. 11, 2014

(87) PCT Pub. No.: WO2014/007177
PCT Pub. Date: Jan. 9, 2014

(65) Prior Publication Data
US 2015/0162793 A1 Jun. 11, 2015

(30) Foreign Application Priority Data
Jul. 3, 2012 (JP) .................................. 2012-149261

(51) Int. Cl.
*H02K 3/00* (2006.01)
*H02K 3/28* (2006.01)
(Continued)

(52) U.S. Cl.
CPC ................. *H02K 3/28* (2013.01); *H02K 3/18* (2013.01); *H02K 3/522* (2013.01); *H02K 3/04* (2013.01);
(Continued)

(58) Field of Classification Search
CPC .. H02K 3/28; H02K 3/38; H02K 3/50; H02K 3/52; H02K 3/24; H02K 3/00; H02K 3/04;
(Continued)

(56) References Cited

U.S. PATENT DOCUMENTS

2004/0263015 A1* 12/2004 Okada ................... H02K 3/522
310/194
2007/0205678 A1* 9/2007 Takashima ............. H02K 3/522
310/71
(Continued)

FOREIGN PATENT DOCUMENTS

DE 212009000080 U1 3/2011
JP 2007-089272 * 4/2007
(Continued)

OTHER PUBLICATIONS

Translation of JP 2010 110122 from EPO website.*
(Continued)

*Primary Examiner* — Michael Andrews
*Assistant Examiner* — Maged Almawri
(74) *Attorney, Agent, or Firm* — Oliff PLC

(57) ABSTRACT

A stator configured with an annular stator core, and a plurality of coils mounted on the stator core. The bus bar portion being connected to the terminal portion of a different
(Continued)

one of the coils of the same phase. The coil is a multi-layer coil that is formed by winding the conductor in a plurality of layers in an inside-outside direction of loops in the winding portion, and that includes on inner and outer peripheral sides of a coil end portion of the coil a plurality of lane change portions formed by the conductor. The bus bar portion is embedded in a clearance between the lane change portions of the coil of a different phase placed between the coils of the same phase which are connected to each other.

6 Claims, 6 Drawing Sheets

(51) Int. Cl.
*H02K 3/18* (2006.01)
*H02K 3/52* (2006.01)
*H02K 3/04* (2006.01)

(52) U.S. Cl.
CPC ..... *H02K 2203/06* (2013.01); *H02K 2203/09* (2013.01)

(58) Field of Classification Search
CPC ............ H02K 3/12; H02K 3/18; H02K 3/325; H02K 3/34; H02K 3/46; H02K 3/505; H02K 3/522; H02K 2203/06; H02K 2203/09
USPC ........................................... 310/71, 179–220
See application file for complete search history.

(56) References Cited

U.S. PATENT DOCUMENTS

| | | | | |
|---|---|---|---|---|
| 2008/0079328 A1* | 4/2008 | Shichijoh | ................ | H02K 3/50 310/184 |
| 2008/0093948 A1* | 4/2008 | Naganawa | ........... | H02K 15/063 310/203 |
| 2008/0136274 A1* | 6/2008 | Fujii | ................ | H02K 3/12 310/71 |
| 2008/0136284 A1* | 6/2008 | Fujii | ................ | H02K 3/12 310/214 |
| 2009/0200879 A1* | 8/2009 | Ghodsi-Khameneh | .. | H02K 3/28 310/71 |
| 2009/0200888 A1* | 8/2009 | Tanaka | ................ | H02K 3/12 310/195 |
| 2010/0207466 A1 | 8/2010 | Endo et al. | | |
| 2010/0244617 A1* | 9/2010 | Nobata | ................ | H02K 3/48 310/216.069 |
| 2011/0175472 A1* | 7/2011 | Koike | ................ | H02K 3/12 310/71 |
| 2011/0175483 A1* | 7/2011 | Koike | ................ | H02K 3/12 310/201 |
| 2011/0215660 A1* | 9/2011 | Goto | ................ | H02K 3/24 310/53 |
| 2012/0007460 A1* | 1/2012 | Kitamura | ................ | H02K 3/12 310/195 |
| 2012/0019081 A1* | 1/2012 | Tamura | ................ | H02K 3/12 310/43 |
| 2012/0086298 A1 | 4/2012 | Fubuki et al. | | |
| 2012/0104885 A1* | 5/2012 | Cominetti | ................ | H02K 3/12 310/71 |
| 2014/0292124 A1* | 10/2014 | Nakamura | ........... | H02K 15/026 310/71 |
| 2014/0375154 A1* | 12/2014 | Sugiura | ................ | H02K 3/28 310/54 |
| 2015/0022047 A1* | 1/2015 | Shibata | ................ | H02K 3/28 310/208 |
| 2015/0076952 A1* | 3/2015 | Portner | ................ | H02K 3/38 310/198 |
| 2015/0207374 A1* | 7/2015 | Tsuiki | ................ | H02K 3/28 310/202 |

FOREIGN PATENT DOCUMENTS

| | | | | |
|---|---|---|---|---|
| JP | 2007-089272 A | | 4/2007 | |
| JP | 2007089272 | * | 4/2007 | |
| JP | A-2008-312290 | | 12/2008 | |
| JP | A-2009-33832 | | 2/2009 | |
| JP | A-2009-118636 | | 5/2009 | |
| JP | A-2010-110122 | | 5/2010 | |
| JP | 2010 110122 | * | 6/2010 | |
| JP | A 2010110122 | * | 10/2010 | ............ H02K 3/522 |
| WO | 2010/058278 A2 | | 5/2010 | |

OTHER PUBLICATIONS ip.com Search Aug. 2, 2017.*
International Search Report issued in International Patent Application No. PCT/JP2013/067903 dated Sep. 10, 2013.
Feb. 28, 2017 Search Report issued in European Patent Application No. 13812911.9.

* cited by examiner

STATOR WITH BUS BAR PORTION EMBEDDED BETWEEN ADJACENT LANE CHANGE PORTIONS AND CONNECTED TO TERMINAL PORTION

TECHNICAL FIELD

Exemplary embodiments of the present invention are directed to stators for rotating electrical machines which have coils placed in a plurality of slots in a stator core.

BACKGROUND ART

As related art of stators for rotating electrical machines (motors), Patent Document 1 discloses a stator in which adjacent coils of the same phase are connected by a connecting wire (bus bar portion) formed by extending one end of a coil wire (conductor) forming a coil.

RELATED ART DOCUMENT

Patent Document

[Patent Document 1] Japanese Patent Application Publication No. 2010-110122 (JP 2010-110122 A)

SUMMARY

Problem to be Solved

In the stator disclosed in Patent Document 1, however, the connecting wires are located at a position outward of winding portions of the coils in the direction of the central axis of a stator core. This increases the height of a coil end, and thus increases the size of the stator in the direction of the central axis thereof.

Exemplary embodiments were developed to solve the above problem, and exemplary embodiments provide a stator capable of achieving reduction in size of the stator in the direction of the central axis thereof.

Means for Solving the Problem

According to a preferred embodiment, a stator including an annular stator core, and a plurality of coils mounted on the stator core and each including a winding portion formed by winding a conductor in a loop shape, a bus bar portion extended from one end of the winding portion, and a terminal portion extended from the other end of the winding portion, the bus bar portion being connected to the terminal portion of a different one of the coils of the same phase is characterized in that the coil is a multi-layer coil that is formed by winding the conductor in a plurality of layers in an inside-outside direction of loops in the winding portion, and that includes on inner and outer peripheral sides of a coil end portion of the coil a plurality of lane change portions formed by the conductor, and the bus bar portion is embedded in a clearance between the lane change portions of the coil of a different phase placed between the coils of the same phase which are connected to each other.

According to this aspect, the bus bar portion is embedded in the clearance between the lane change portions of the coil of the different phase placed between the coils of the same phase which are connected to each other. Accordingly, a coil end can be reduced in height, and the stator can therefore be reduced in size in a direction of a central axis thereof. Moreover, the position of the bus bar portion is stabilized, and the coils of the same phase can be reliably connected to each other by the bus bar portion.

In the above aspect, it is preferable that the terminal portion be formed by bending the conductor at the other end of the winding portion so that the terminal portion extends perpendicularly to the direction of the central axis of the stator core and is located outward of the winding portion in a radial direction of the stator core.

According to this aspect, the terminal portion of the coil is formed by bending the conductor at the other end of the winding portion so that the terminal portion extends perpendicularly to the direction of the central axis of the stator core. Accordingly, a joint portion of the bus bar portion and the terminal portion is located at a lower height in the direction of the central axis of the stator core. The coil end can therefore be reliably reduced in height, and the stator can thus be reliably reduced in size in the direction of the central axis thereof.

The terminal portion of the coil is formed outward of the winding portion in the radial direction of the stator core. Accordingly, work space can be secured outside the winding portion, thereby facilitating joining work of the bus bar portion and the terminal portion.

In the above aspect, it is preferable that the terminal portion be formed to extend in a circumferential direction of the stator core.

According to this aspect, the joint portion of the bus bar portion and the terminal portion can be formed to extend in the circumferential direction of the stator core, whereby the stator can be reduced in size in the radial direction thereof. When sealing the coils with resin after mounting them on the stator core, the coils can be reliably sealed with the resin even if the back yoke has a small width. Moreover, when forming a motor by attaching the stator to a case, a clearance can be secured between the joint portion of the bus bar portion and the terminal portion and the case. This improves insulation capability of the motor.

In the above aspect, it is preferable that the bus bar portion be extended from an end of the winding portion which is an inner end in the radial direction of the stator core, and the terminal portion be extended from an end of the winding portion which is an outer end in the radial direction of the stator core.

According to this aspect, the joint portion of the bus bar portion and the terminal portion can be formed at an outer position in the radial direction of the stator core. Accordingly, a rotor that is attached inward of an inner peripheral surface of the stator core does not interfere with the joint portion of the bus bar portion and the terminal portion. This improves the case of assembly of the rotor.

In accordance with preferred embodiments, the stator can be reduced in size in the direction of the central axis thereof.

DESCRIPTION

Figure 1:
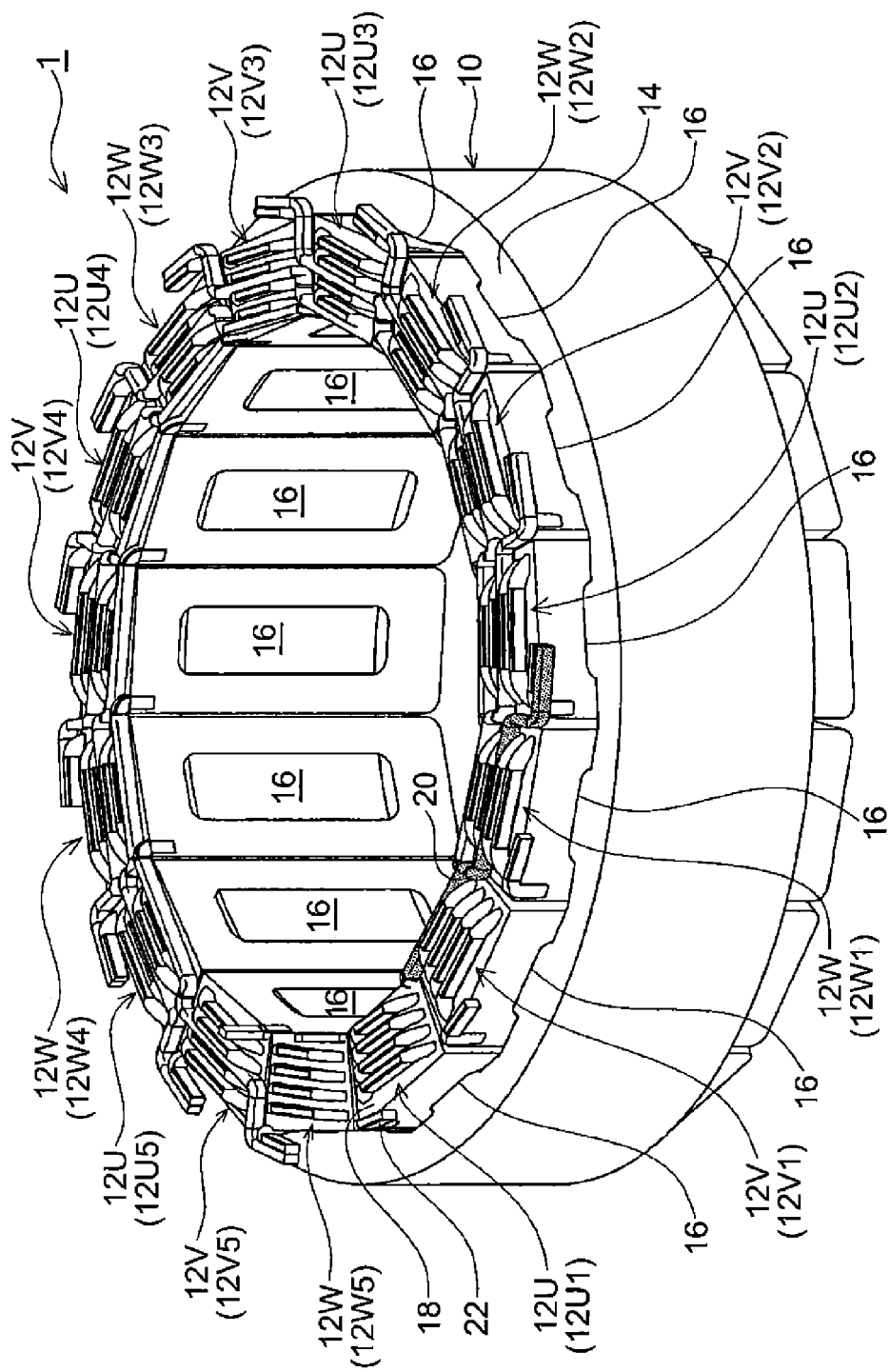
FIG. 1 is a perspective view showing the appearance of a stator.
Figure 2:
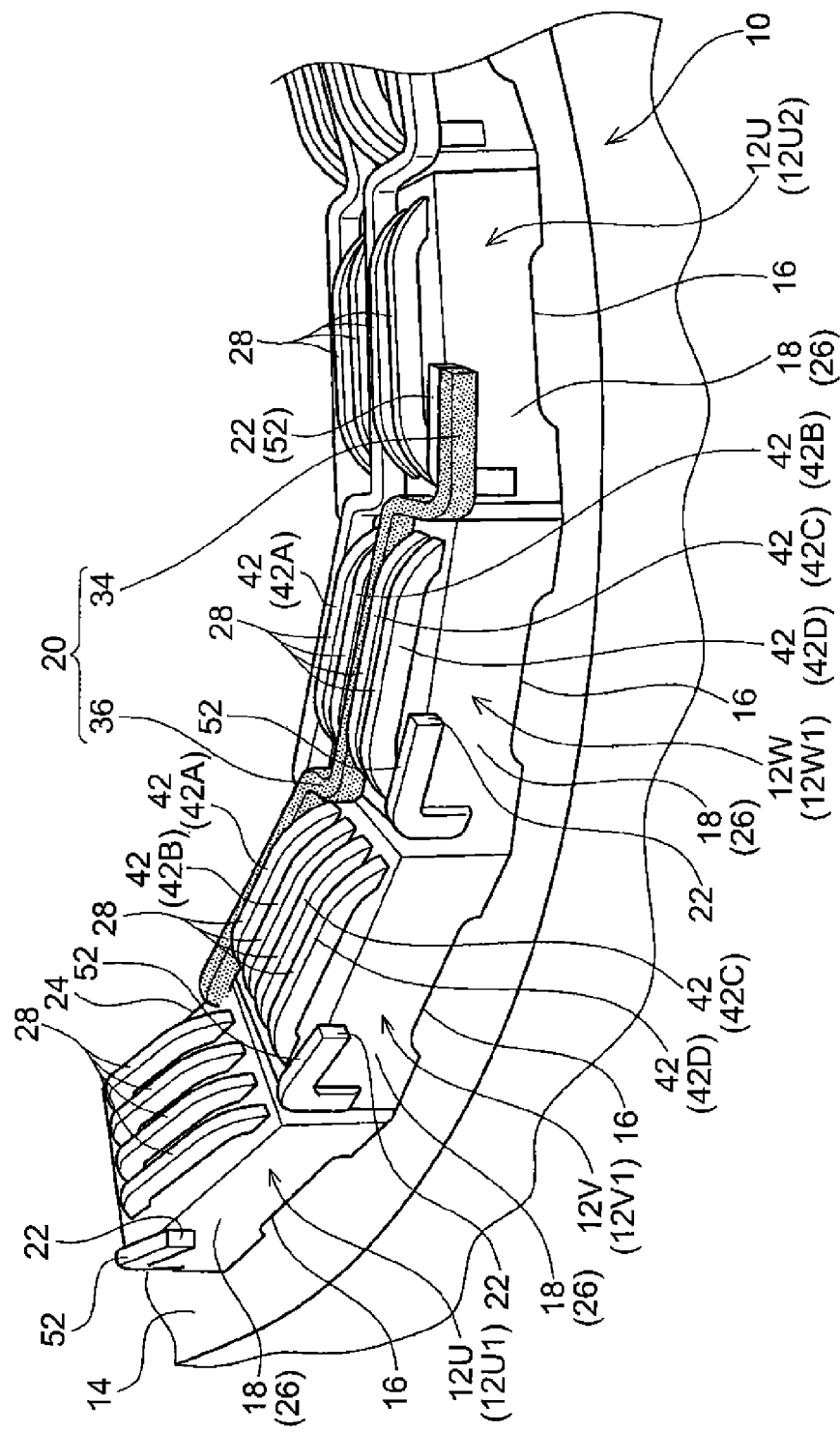
FIG. 2 is an enlarged view of a main part of FIG. 1.

A stator 1 (stator) of an embodiment will be described. As shown in FIGS. 1 to 4, the stator 1 has a stator core 10, coils 12 (coils 12U, coils 12V, and coils 12W), etc.

The stator core 10 is formed in an annular shape, and includes a back yoke 14 and teeth 16. This stator core 10 is molded integrally in the circumferential direction thereof. The back yoke 14 is formed in an annular shape in the outer peripheral part of the stator core 10. The plurality of teeth 16 are formed so as to protrude radially inward from the inner peripheral surface of the back yoke 14. A slot (not shown) is formed between adjacent ones of the teeth 16.

Figure 5:
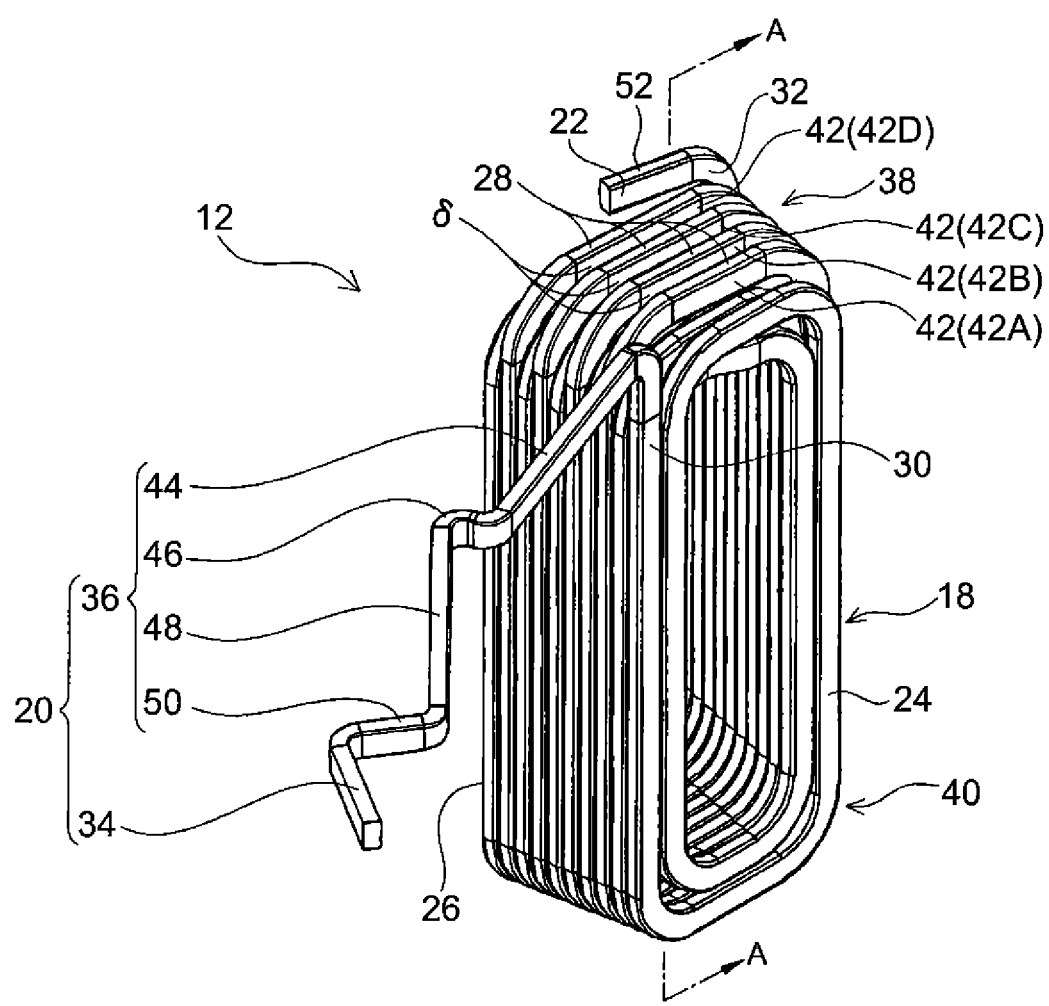
FIG. 5 is a view (perspective view) showing a single coil.

The plurality of coils 12 are mounted so as to be intensively wound around the teeth 16 of the stator core 10 via an insulator of an insulating member (not shown). A rectangular conductor forming the coil 12 has an enameled surface in order to ensure insulation between adjacent rectangular conductors. By way of example, the coils 12 are edgewise coils in the present embodiment, as shown in FIG. 5. The "edgewise coil" is a coil shaped by winding a rectangular conductor while bending it toward in a short-side direction of its rectangular cross-section such that a surface along one of the short sides of the rectangular cross-section serves as an inner peripheral surface and the other of the short sides of the rectangular cross-section serves as an outer peripheral surface.

As shown in FIG. 5, the coil 12 is a two-layer coil formed by winding the rectangular conductor in two layers, namely an inner layer and an outer layer. The coil 12 may be a coil formed by winding the rectangular conductor in three or more layers further including an intermediate layer between the inner layer and the outer layer. That is, the coil 12 is a multi-layer coil formed by winding the rectangular conductor in a plurality of layers in the inside-outside direction of the loops in the winding portion 18. As used herein, the expression "inside-outside direction of the loops" refers to the direction from inside to outside of the loops of the rectangular conductor in the winding portion 18 (the circumferential direction of the stator core 10 in FIG. 3).

The coils 12 include U-phase coils 12U, V-phase coils 12V, and W-phase coils 12W. The U-phase, V-phase, and W-phase coils 12U, 12V, 12W are sequentially arranged in a repeated pattern of the U-phase coil 12U, the V-phase coil 12V, and the W-phase coil 12W in the circumferential direction of the stator core 10. The U-phase, V-phase, and W-phase coils 12U, 12V, 12W are mounted on the teeth 16 of the stator core 10 so that the coils 12 of the same phase are arranged at intervals. Adjacent ones of the coils 12 of the same phase (the same phase out of the U, V, and W-phases) are electrically connected to each other.

In the example shown in FIG. 1, the stator 1 includes U-phase coils 12U1, 12U2, 12U3, 12U4, 12U5, V-phase coils 12V1, 12V2, 12V3, 12V4, 12V5, and W-phase coils 12W1, 12W2, 12W3, 12W4, 12W5. These U-phase, V-phase, and W-phase coils 12U, 12V, 12W are arranged in order of the U-phase coil 12U1, the V-phase coil 12V1, the W-phase coil 12W1, the U-phase coil 12U2, the V-phase coil 12V2, the W-phase coil 12W2, . . . , and the U-phase coil 12U5, the V-phase coil 12V5, the WV-phase 12W5 in the circumferential direction of the stator core 10.

More specifically, as shown in FIGS. 1 to 5, the coil 12 includes a winding portion 18, a bus bar portion 20, a terminal portion 22, etc. In FIGS. 1 to 4, the winding portions 18 are shown in a simplified manner.

The winding portion 18 is a portion formed by winding a rectangular conductor in a loop shape and stacking the loops of the rectangular conductor. Specifically, the winding portion 18 includes an inner end face 24, an outer end face 26, an axial end face 28, an inner end 30, an outer end 32, etc.

Figure 6:
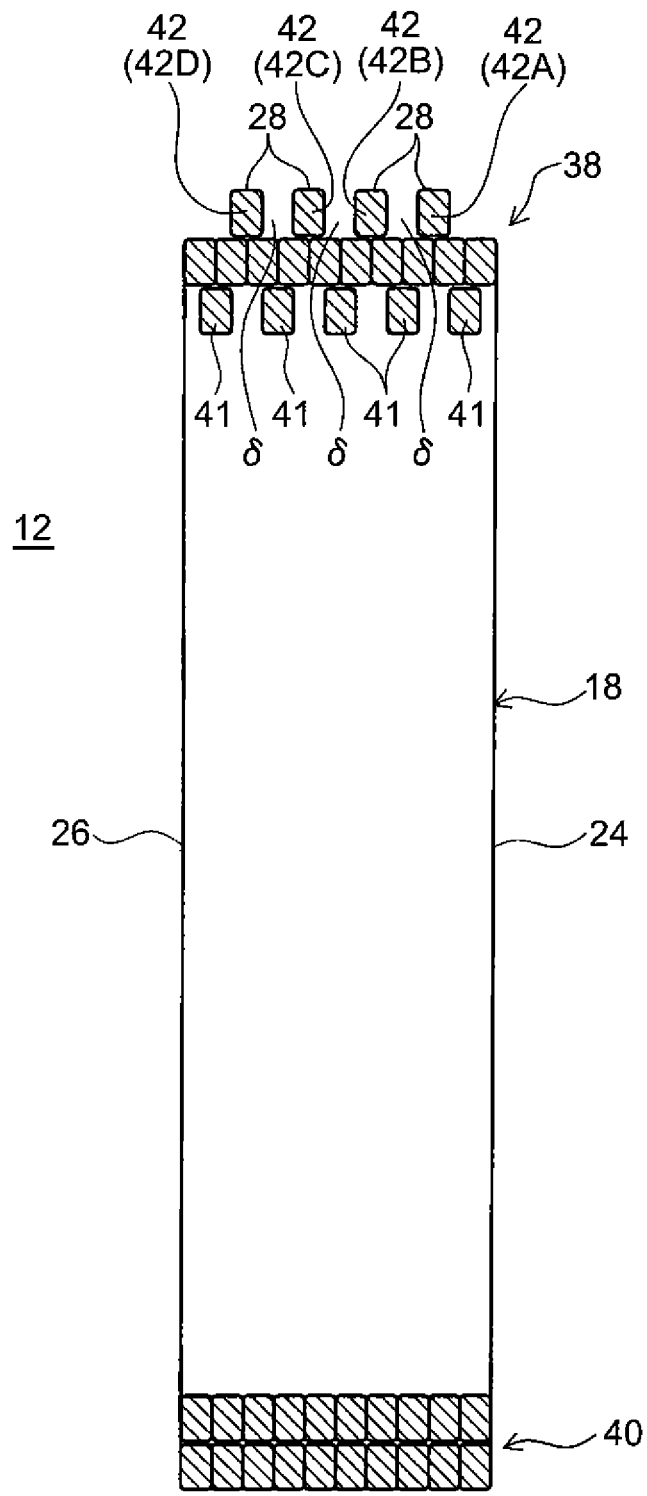
FIG. 6 is an end view along line A-A in FIG. 5.

The inner end face 24 is an end face facing the stacking direction of the rectangular conductors, and is placed on the inner side in the radial direction of the stator core 10 when the coils 12 are mounted on the stator core 10. The outer end face 26 is an end face facing the stacking direction of the rectangular conductors, and is placed on the outer side in the radial direction of the stator core 10 when the coils 12 are mounted on the stator core 10. The axial end face 28 is an end face facing the direction of the central axis of the stator core 10 when the coils 12 are mounted on the stator core 10, and is formed on the side on which the bus bar portion 20 and the terminal portion 22 are formed (lead side). As shown in FIG. 6, the axial end face 28 corresponds to the outer peripheral surface of the rectangular conductor in the outermost layer in a lead-side coil end 38.

The inner end 30 is an end of the rectangular conductor forming the winding portion 18, and is placed on the inner side in the radial direction of the stator core 10 when the coils 12 are mounted on the stator core 10. The outer end 32 is an end of the rectangular conductor forming the winding portion 18, and is placed on the outer side in the radial direction of the stator core 10 when the coils 12 are mounted on the stator core 10.

The bus bar portion 20 is a portion formed by extending the rectangular conductor from the inner end 30 of the winding portion 18. The bus bar portion 20 electrically connects adjacent ones of the coils 12 of the same phase. In the example shown in FIG. 1, the bus bar portion 20 is shifted outward in the radial direction of the stator core 10 from the inner end 30 of the winding portion 18 of one U-phase coil 12U (e.g., 12U1) as it gets closer to a different one (e.g., 12U2) of the U-phase coils 12U which is located adjacent thereto, and the bus bar portion 20 connects to the terminal portion 22 of the different U-phase coil 12U. The bus bar portions 20 are similarly connected between the V-phase coils 12V and between the W-phase coils 12W.

Specifically, the bus bar portion 20 includes a joint part 34 and a connecting part 36. The joint part 34 is a part formed in the tip end of the bus bar portion 20 and joined to the terminal portion 22 of a different one of the coils 12 (the coil 12 of the same phase which is located adjacent thereto). The connecting part 36 is a part formed between the joint part 34 and the winding portion 18.

The terminal portion 22 is a portion formed by extending the rectangular conductor from the outer end 32 of the winding portion 18. The rectangular conductor has its enamel coating removed in the terminal portion 22. The terminal portion 22 is joined to the joint part 34 of the bus bar portion 20 in a different one of the coils 12 of the same phase which is located adjacent thereto.

Although not shown in the figures, a neutral point of the stator 1 is formed by connecting the inner end 30 of the U-phase coil 12U5, the inner end 30 of the V-phase coil 12V5, and the inner end 30 of the W-phase coil 12W5. Respective external wires (not shown) are connected to the terminal portion 22 of the U-phase coil 12U1, the terminal portion 22 of the V-phase coil 12V1, and the terminal portion 22 of the W-phase coil 12W1.

As shown in FIG. 5, the coil 12 includes a lead-side coil end 38 and a non-lead-side coil end 40. The coil 12 includes a lane change portion 42 that is formed by the rectangular conductor in the outermost layer of the winding portion 18 in the lead-side coil end 38. A plurality of the lane change portions 42 (four in the example of FIG. 5) are formed with a clearance δ therebetween in the stacking direction of the rectangular conductors. In this example, the lane change portions 42 are a first lane change portion 42A, a second lane change portion 42B, a third lane change portion 42C, and a fourth lane change portion 42D sequentially from the inner end face 24 side. More specifically, as shown in FIG. 6, the coil 12 has three layers of the rectangular conductor in the lead-side coil end 38, and includes a plurality of lane change portions 41 formed by the rectangular conductor in the innermost layer in addition to the lane change portions 42. Each of the lane change portion 41 and the lane change portion 42 is a portion that shifts to the next lane in the stacking direction of the rectangular conductors.

In the stator 1, the connecting part 36 of the bus bar portion 20 is embedded in the winding portions 18 of the coils 12 of the other phases which are located between the coils 12 of the same phase connected to each other. Specifically, the connecting part 36 is placed at the same height as the lane change portions 42 of the coils 12 of the other phases in the direction of the central axis of the stator core 10 and located next to the lane change portions 42.

Figure 3:
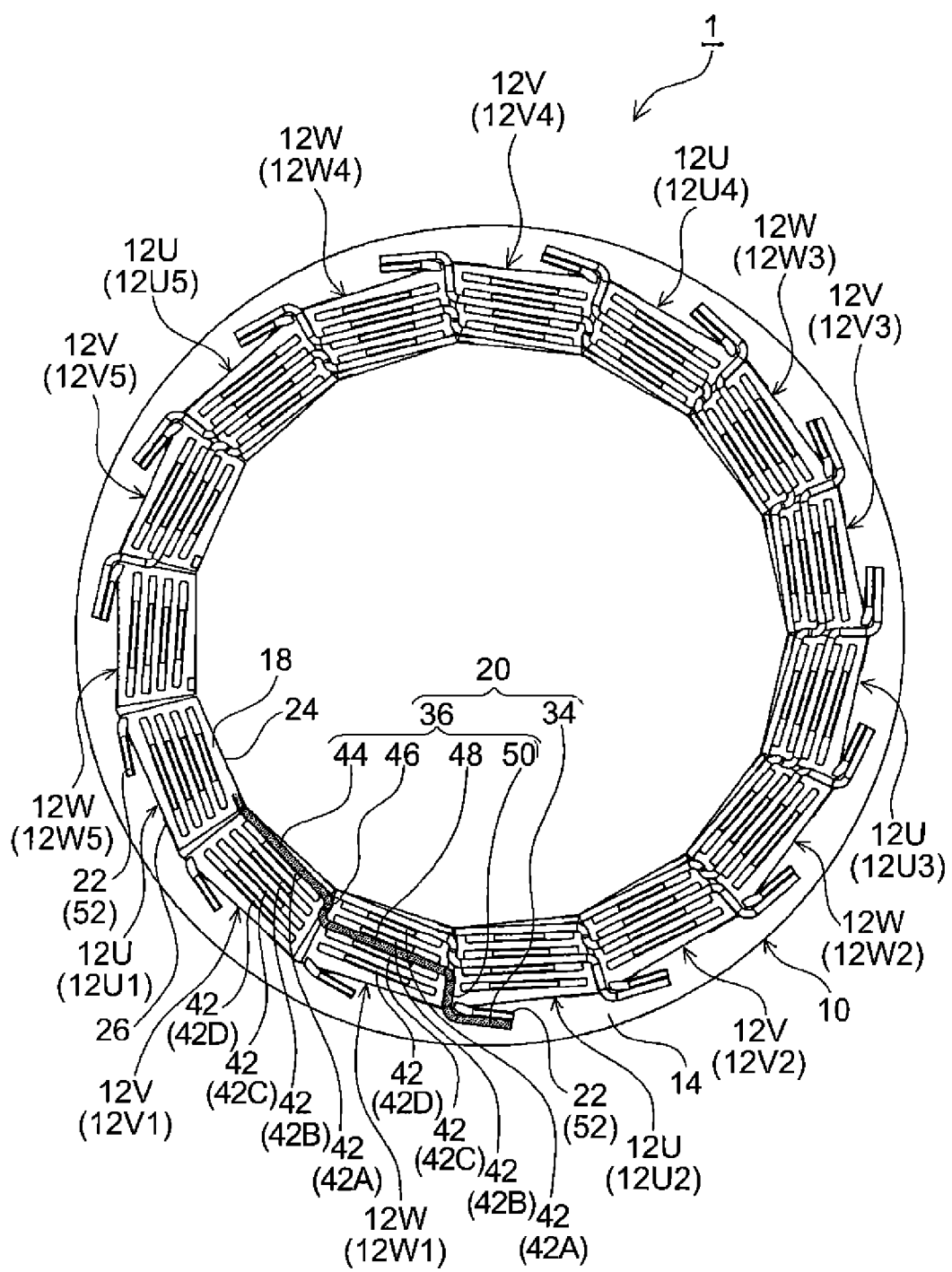
FIG. 3 is a top view of the stator.

This will be described in more detail by using the connecting part 36 of the bus bar portion 20 of the U-phase coil 12U1 as a representative example. As shown in FIG. 3, a first part 44 of the connecting part 36 is placed in the circumferential direction so as to be embedded in the winding portion 18 at a position inward of the first lane change portion 42A of the V-phase coil 12V1, and a first shift part 46 of the connecting part 36 is placed in the radial direction between the V-phase coil 12V1 and the W-phase coil 12W1. Moreover, a second part 48 of the connecting part 36 is placed in the circumferential direction so as to be embedded in the winding portion 18 in the clearance δ (see FIGS. 5 and 6) between the second lane change portion 42B and the third lane change portion 42C of the W-phase coil 12W1, and a second shift part 50 of the connecting part 36 is placed in the radial direction between the W-phase coil 12W1 and the U-phase coil 12U2. The bus bar portion 20 of the U-phase coil 12U1 is shown shaded in FIGS. 1 to 3.

The second part 48 of the connecting part 36 of the bus bar portion 20 of the U-phase coil 12U1 may be embedded in the clearance δ between the first lane change portion 42A and the second lane change portion 42B of the W-phase coil 12W1 or in the clearance δ between the third lane change portion 42C and the fourth lane change portion 42D of the W-phase coil 12W1.

The first part 44 of the connecting part 36 of the bus bar portion 20 of the U-phase coil 12U1 may be embedded in any of the clearances δ. In this case, the second part 48 of the connecting part 36 is embedded in the clearance δ located outward of the first part 44 in the radial direction of the stator core 10.

Figure 4:
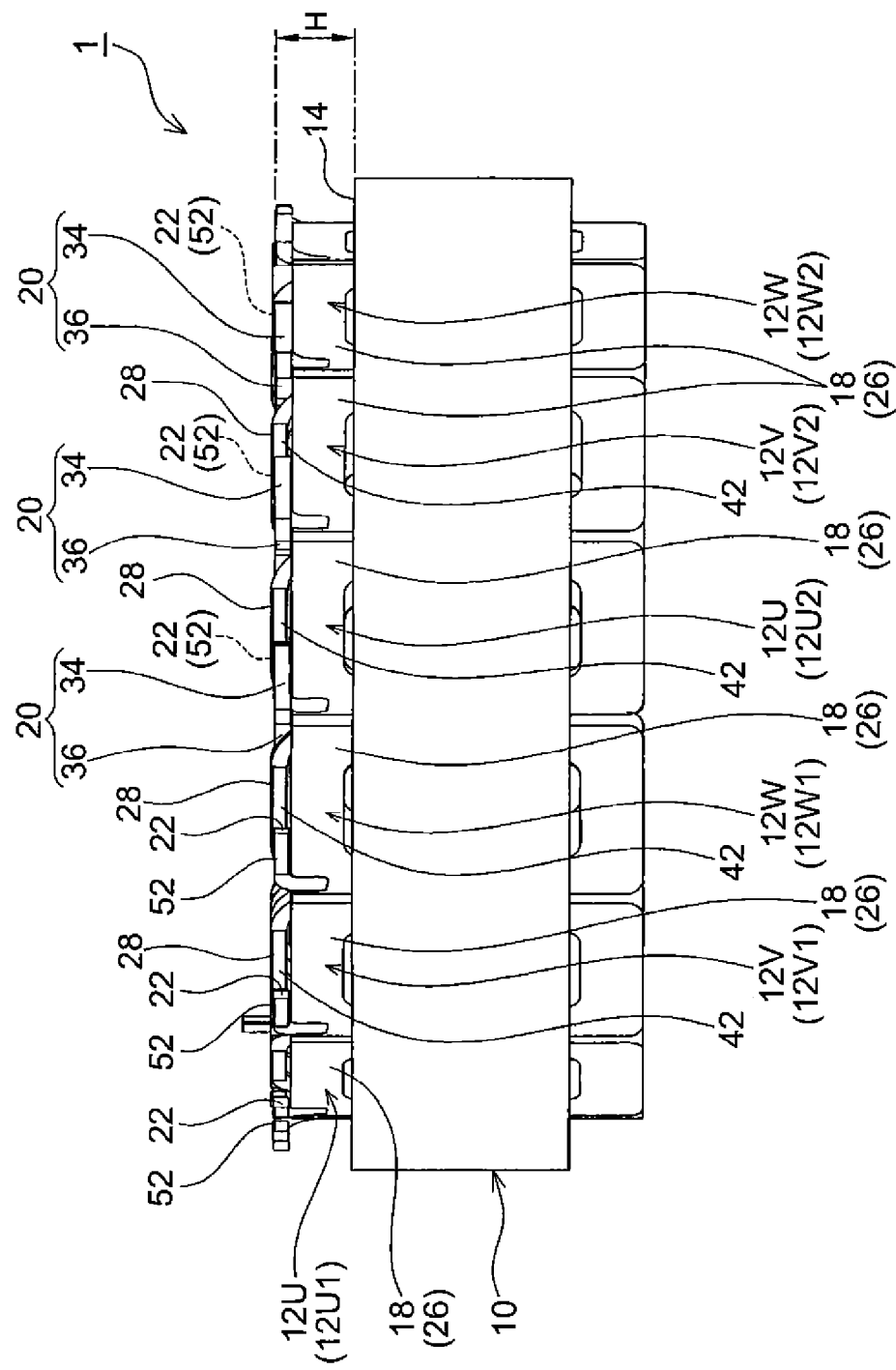
FIG. 4 is a side view of the stator.

As shown in FIGS. 4 and 5, the terminal portion 22 is formed by bending the rectangular conductor at the outer end 32 of the winding portion 18 so that the terminal portion 22 is tilted perpendicularly to the direction of the central axis of the stator core 10. That is, the direction of the central axis of the terminal portion 22 does not match the direction of the central axis of the stator core 10, and is tilted perpendicularly to the direction of the central axis of the stator core 10. The terminal portion 22 is formed so as to be located inward of the axial end face 28 of the winding portion 18 in the direction of the central axis of the stator core 10. Specifically, an upper surface 52 (surface on the upper side in FIG. 4) of the terminal portion 22 is located at the same position as the axial end face 28 of the winding portion 18 in the direction of the central axis of the stator core 10.

As shown in FIG. 3, the terminal portion 22 is formed outward of the outer end face 26 of the winding portion 18 in the radial direction of the stator core 10 and extends in the circumferential direction of the stator core 10.

The stator of the first embodiment described above has the following advantageous effects. In the stator 1, the connecting part 36 of the bus bar portion 20 is embedded in the clearance δ between the lane change portions 42 of the coil 12 of a different phase which is located between the coils 12 of the same phase connected to each other. Accordingly, the height H (see FIG. 4) of the coil end can be reduced, and the stator 1 can therefore be reduced in size in the direction of the central axis thereof. Moreover, the position of the bus bar portion 20 is stabilized, and the coils 12 of the same phase can be reliably connected to each other by the bus bar portion 20.

The terminal portion 22 of the coil 12 is formed by bending the rectangular conductor at the outer end 32 of the winding portion 18 so that the terminal portion 22 extends perpendicularly to the direction of the central axis of the stator core 10. Accordingly, the joint portion of the bus bar portion 20 and the terminal portion 22 is located at a lower height in the direction of the central axis of the stator core 10. The height H of the coil end can therefore be reliably reduced, and the stator 1 can thus be reliably reduced in size in the direction of the central axis thereof.

The terminal portion 22 of the coil 12 is formed outward of the outer end face 26 of the winding portion 18 in the radial direction of the stator core 10. Accordingly, work space can be secured outside the outer end face 26 of the winding portion 18, thereby facilitating joining work of the bus bar portion 20 and the terminal portion 22.

The terminal portion 22 of the coil 12 is formed to extend in the circumferential direction of the stator core 10. Accordingly, the joint portion of the bus bar portion 20 and the terminal portion 22 can be formed to extend in the circumferential direction of the stator core 10, whereby the stator 1 can be reduced in size in the radial direction thereof. When sealing the coils 12 with resin after mounting them on the stator core 10, the coils 12 can be reliably sealed with the resin even if the back yoke 14 has a small width. Moreover, when forming a motor (not shown) by attaching the stator 1 to a case (not shown), a clearance can be secured between the joint portion of the bus bar portion 20 and the terminal portion 22 and the case. This improves insulation capability of the motor.

The bus bar portion 20 is extended from the inner end 30 of the winding portion 18, and the terminal portion 22 is extended from the outer end 32 of the winding portion 18. The joint portion of the bus bar portion 20 and the terminal portion 22 can thus be formed at an outer position in the radial direction of the stator core 10. Accordingly, a rotor (not shown) that is attached inward of the inner peripheral surface of the stator core 10 does not interfere with the joint portion of the bus bar portion 20 and the terminal portion 22. This improves the ease of assembly of the rotor.

As a modification, an embodiment is also possible in which the connecting part 36 of the bus bar portion 20 is placed outward of the outermost lane change portion 42 in the radial direction of the stator core 10 instead of being placed in the clearance δ between the lane change portions 42 of the coil 12 of a different phase. In the case of the connecting part 36 of the bus bar portion 20 of the U-phase coil 12U1 as a representative example, an embodiment is also possible in which the second part 48 of the connecting part 36 of the bus bar portion 20 of the U-phase coil 121U11 is placed outward of the fourth lane change portion 42D of the W-phase coil 12W1 instead of being placed in the clearance δ between the second lane change portion 42B and the third lane change portion 42C of the W-phase coil 12W1.

As a modification, an embodiment is also possible in which the bus bar portion 20 is formed by extending the rectangular conductor from the outer end 32 of the winding portion 18 and the terminal portion 22 is formed by extending the rectangular conductor from the inner end 30 of the winding portion 18.

As a modification, an embodiment is also possible in which the coil 12 is a single-layer coil formed by winding the rectangular conductor in a single layer in the winding portion 18 with a clearance between adjacent ones of the loops of the rectangular conductor and the connecting part 36 of the bus bar portion 20 is placed so as to be embedded in the clearance between the loops of the rectangular conductor of the winding portion 18. Moreover, as a modification, an embodiment is also possible in which the coil 12 is a coil formed by winding the rectangular conductor in three or more layers in the winding portion 18 and the connecting part 36 of the bus bar portion 20 is placed so as to be embedded in the clearance δ between the lane change portions 42.

It should be understood that the above embodiments are shown by way of illustration only, and are not intended to limit the present invention in any respect. Various improvements and modifications can be made without departing from the spirit and scope of the present invention.

DESCRIPTION OF THE REFERENCE NUMERALS

1 Stator
10 Stator Core
12 Coil
14 Back Yoke
16 Tooth
18 Winding Portion
20 Bus Bar Portion
22 Terminal Portion
24 Inner End Face
26 Outer End Face
28 Axial End Face
30 Inner End
32 Outer End
34 Joint Part
36 Connecting part
42 Lane Change Portion
44 First Part (of Connecting part)
48 Second Part (of Connecting part)
δ Clearance

The invention claimed is:
1. A stator comprising:
an annular stator core, and
a plurality of coils mounted on the stator core along a circumferential direction of the stator core, forming multiple phases, and each including a winding portion formed by winding a conductor in a loop shape, a bus bar portion extended from one end of the winding portion, and a terminal portion extended from an other end of the winding portion,
the bus bar portion of one of the plurality of coils being connected to the terminal portion of a different one of the plurality of coils of a same phase that is spaced from the one of the plurality of coils in the circumferential direction, wherein:
each coil is a multi-layer coil that is formed by winding the conductor in a plurality of layers in an inside-outside direction of loops in the winding portion,
each coil includes a plurality of lane change portions in a radial direction of the stator core formed by the conductor on inner and outer sides in a lead-side coil end of the coil in an axial direction of the stator core,
a space is formed between adjacent lane change portions, is recessed in the axial direction of the stator core and is extended along the circumferential direction of the stator core, with a plurality of the spaces formed by the plurality of lane change portions in the radial direction, and
in the circumferential direction of the stator core, the bus bar portion is embedded in the space formed between adjacent lane change portions of the coil of a different phase placed between the coils of the same phase which are connected to each other.

2. The stator according to claim 1, wherein
the terminal portion is formed by bending the conductor at the other end of the winding portion so that the terminal portion extends perpendicularly to a direction of a central axis of the stator core and is located outward of the winding portion in the radial direction of the stator core.

3. The stator according to claim 2, wherein
the terminal portion is formed to extend in the circumferential direction of the stator core.

4. The stator according to claim 1, wherein
the bus bar portion extends from an end of the winding portion which is an inner end in the radial direction of the stator core, and
the terminal portion extends from an end of the winding portion which is an outer end in the radial direction of the stator core.

5. The stator according to claim 2, wherein
the bus bar portion extends from an end of the winding portion which is an inner end in the radial direction of the stator core, and
the terminal portion extends from an end of the winding portion which is an outer end in the radial direction of the stator core.

6. The stator according to claim 3, wherein
the bus bar portion extends from an end of the winding portion which is an inner end in the radial direction of the stator core, and
the terminal portion extends from an end of the winding portion which is an outer end in the radial direction of the stator core.

* * * * *